United States Patent [19]

Christopherson

[11] Patent Number: 5,144,939
[45] Date of Patent: Sep. 8, 1992

[54] BIOMASS PELLET-BURNING ORCHARD HEATERS

[76] Inventor: Ernest W. Christopherson, 81595 D.V.R., Dufur, Oreg. 97021

[21] Appl. No.: 709,315

[22] Filed: Jun. 3, 1991

[51] Int. Cl.⁵ .................. A01G 13/06; F24C 1/00; F23K 3/16
[52] U.S. Cl. .................. 126/25 R; 126/11; 126/25 B; 126/59.5; 126/163 R; 126/19 M; 126/58; 110/108; 110/118
[58] Field of Search .............. 126/7, 10, 11, 25 R, 126/25 B, 59.5, 68, 73, 146, 163 R, 163 A, 276, 19 M, 12, 13, 58, 60, 65, 275 R; 110/105, 108, 293, 294, 118, 102, 116, 117; 47/2

[56] References Cited

U.S. PATENT DOCUMENTS

| | | | |
|---|---|---|---|
| 37,399 | 1/1863 | Hope | 126/29 |
| 1,464,271 | 8/1923 | Rotstein et al. | 126/29 X |
| 1,496,180 | 6/1924 | Smith et al. | |
| 1,767,670 | 6/1930 | Huff | |
| 1,832,223 | 11/1931 | Klopfenstein | 110/293 |
| 1,934,339 | 11/1933 | Winberg | |
| 2,697,427 | 12/1954 | Rigali | |
| 2,902,991 | 9/1959 | Whitman | |
| 4,253,407 | 2/1991 | Larson | 110/102 |
| 4,587,947 | 5/1986 | Tomita | 126/25 R |
| 4,989,521 | 2/1991 | Traeger et al. | 110/108 |
| 5,002,037 | 3/1991 | Armstrong et al. | 126/29 |

FOREIGN PATENT DOCUMENTS 11314 6/1892 Norway ............... 126/73

*Primary Examiner*—Carl D. Price
*Attorney, Agent, or Firm*—Eugene D. Farley

[57] ABSTRACT

An orchard heater burns wood or other biomass pellets substantially without the production of soot or smudge. The heater assembly includes demountable, telescoping components including a combustion chamber, a chimney, a firebox, and a hopper. Combination air- and fuel-flow control means control the combustion process. An oven or a grill attachment may be included in the assembly for cooking purposes, if so desired.

14 Claims, 4 Drawing Sheets

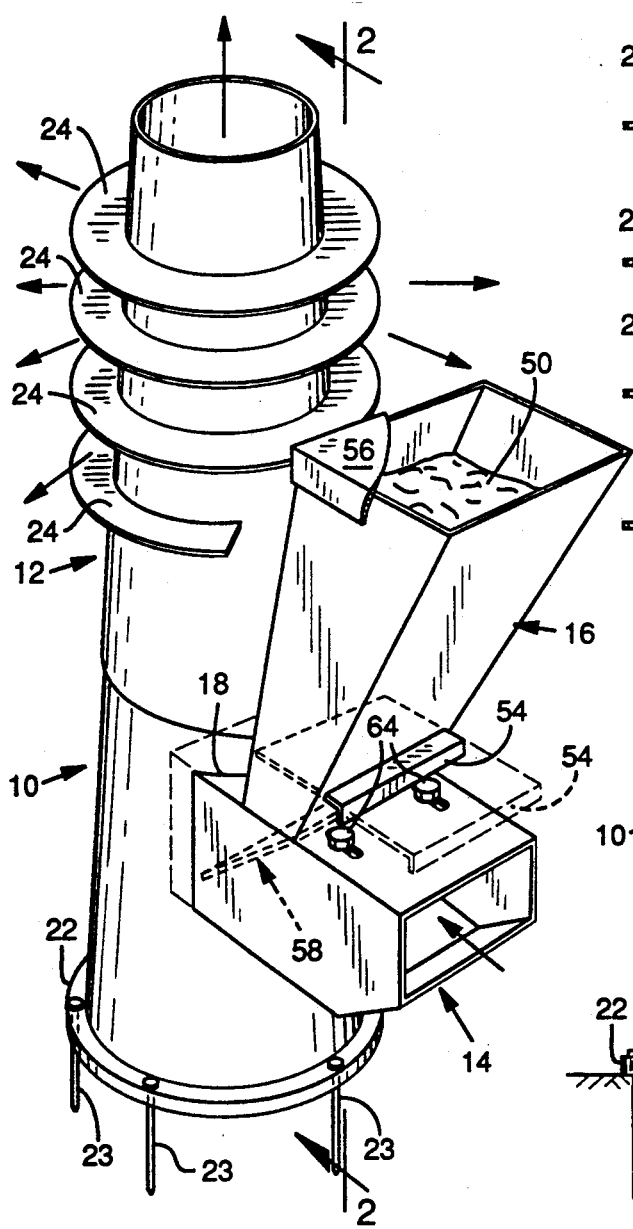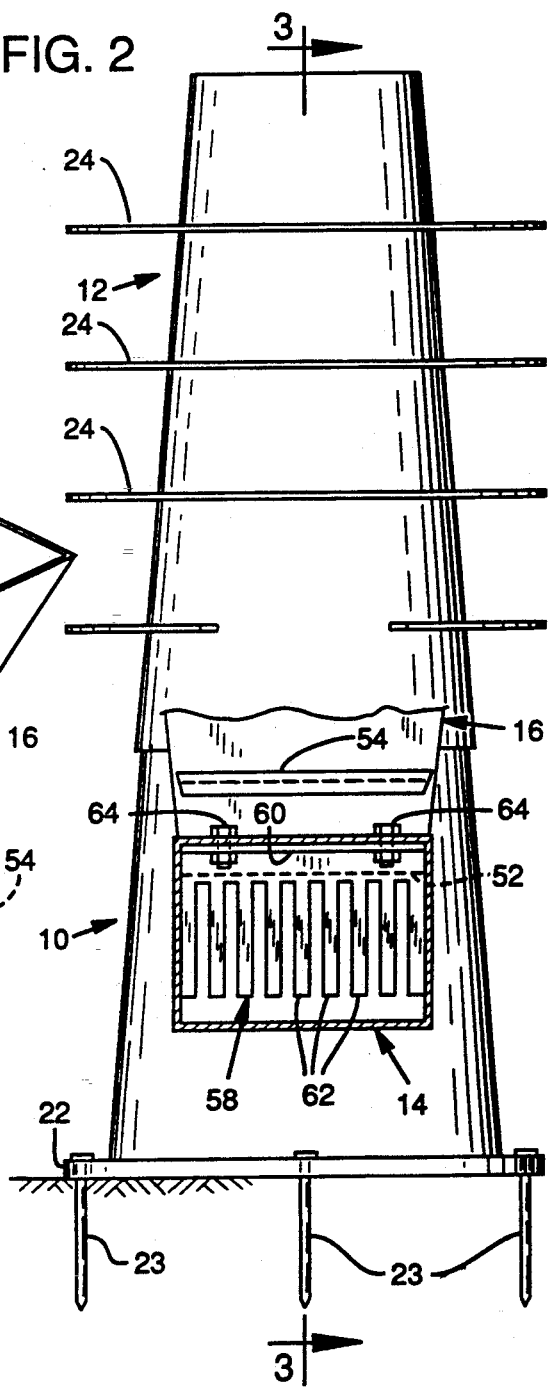

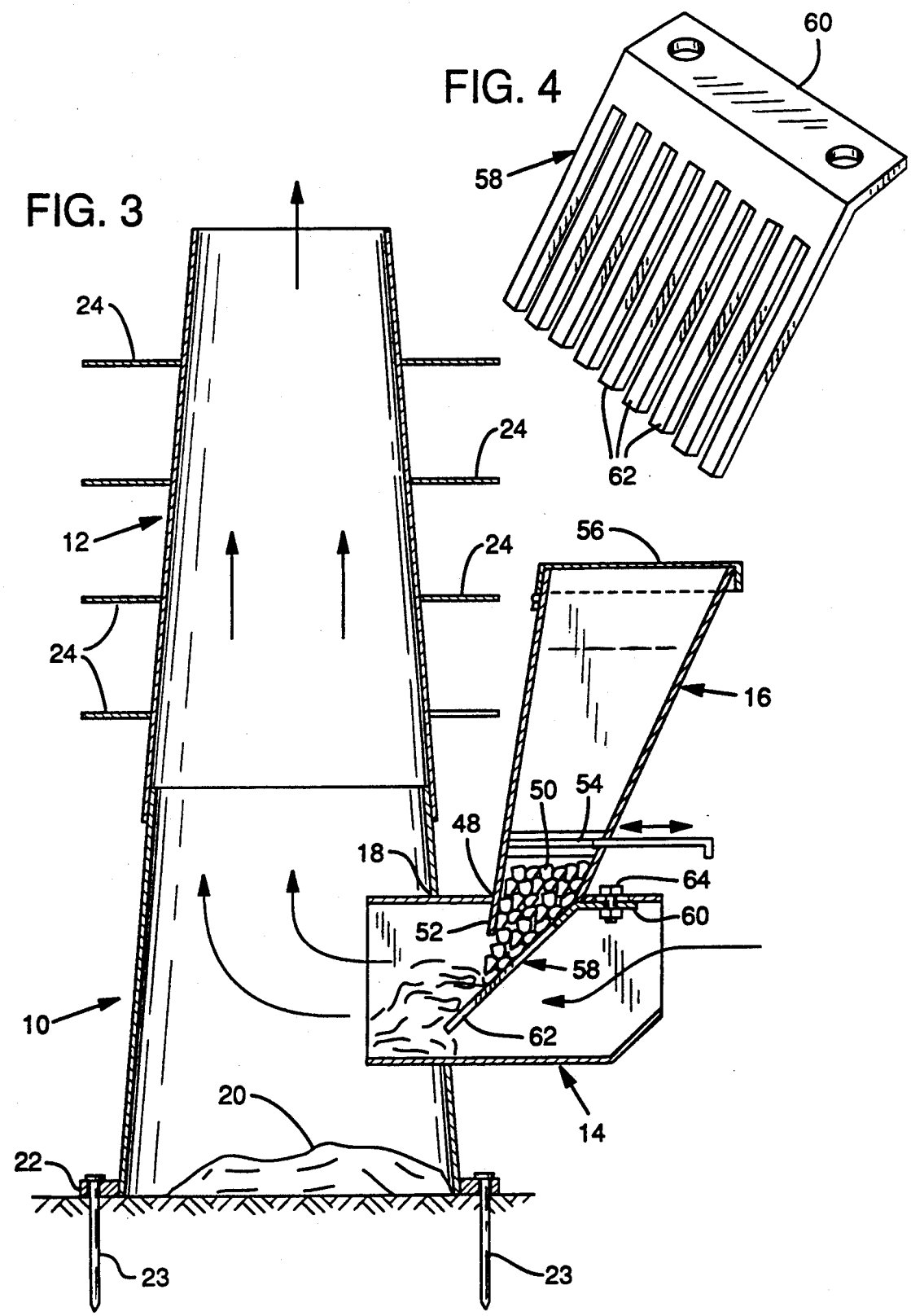

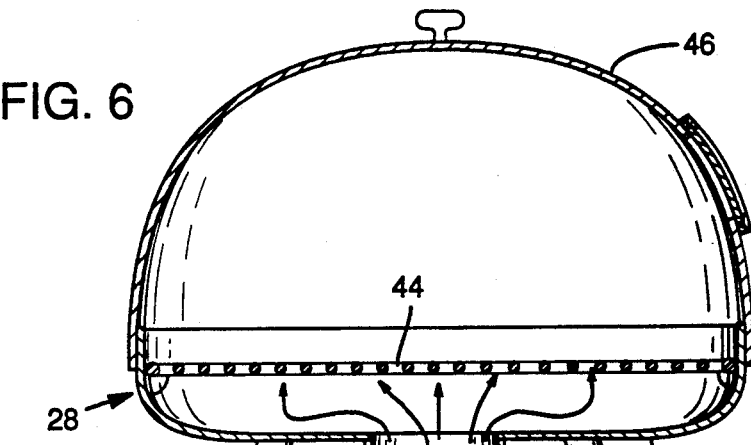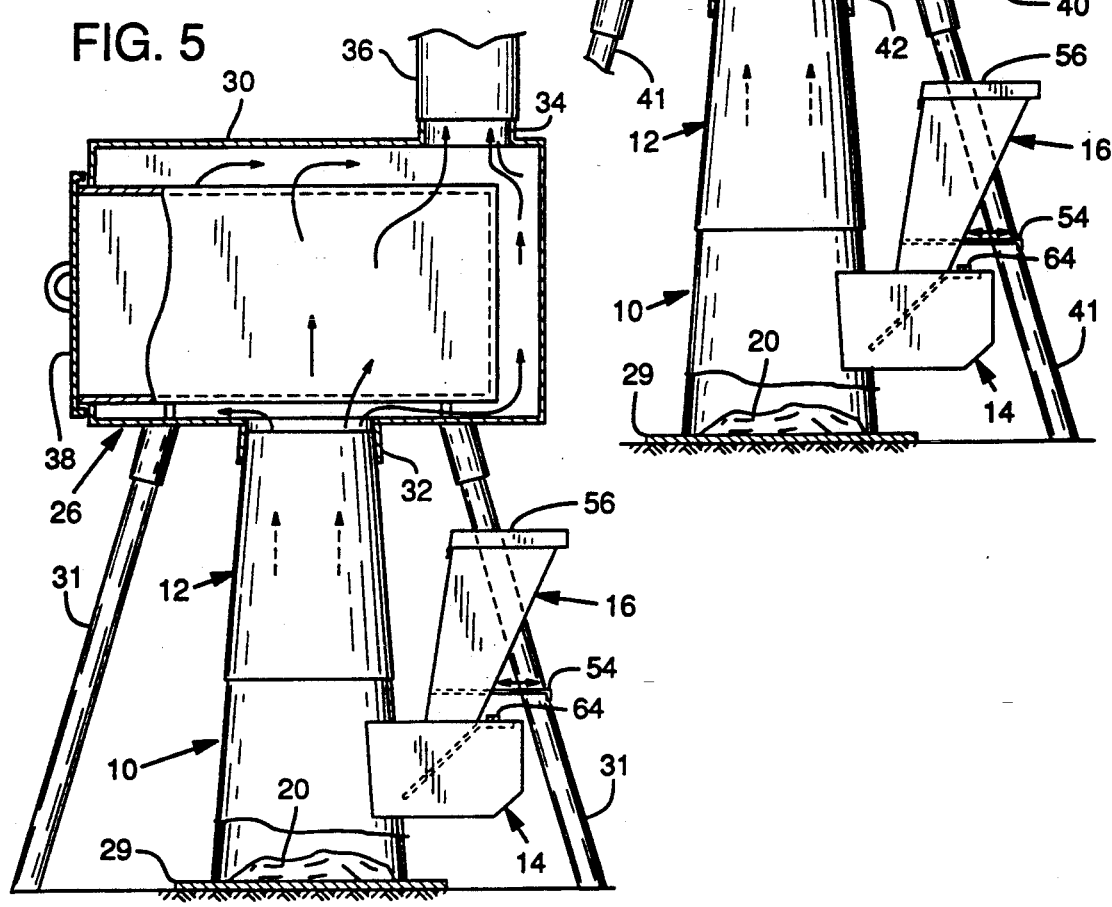

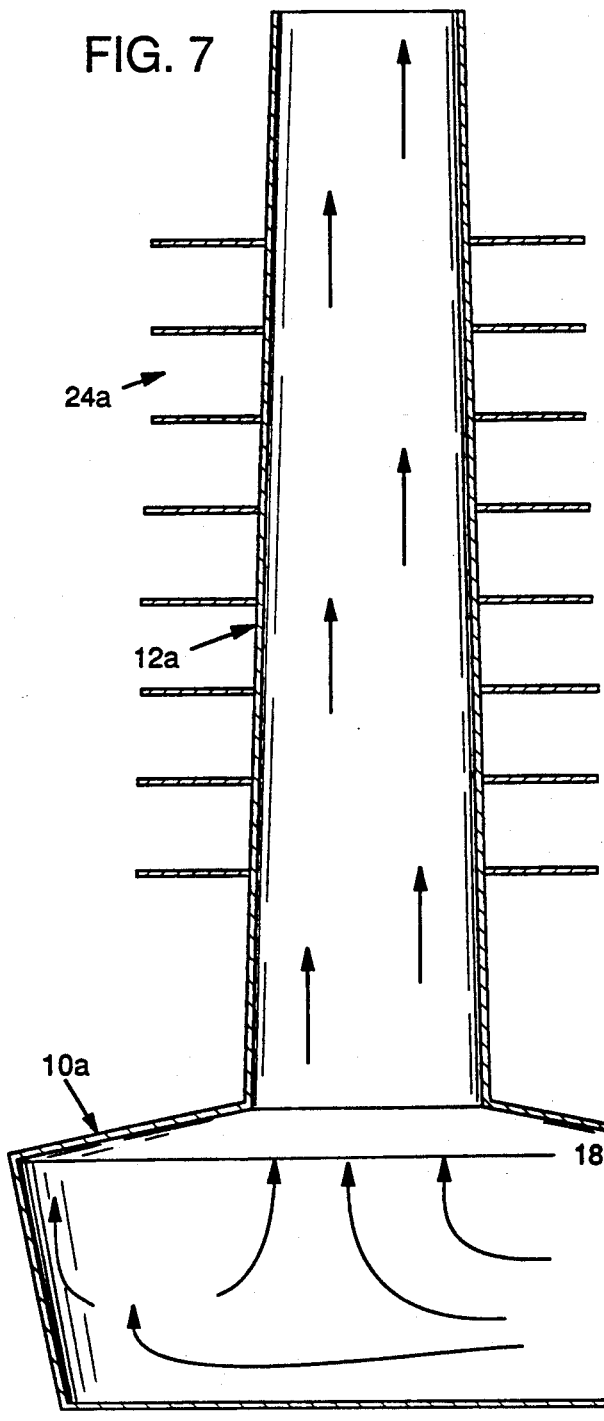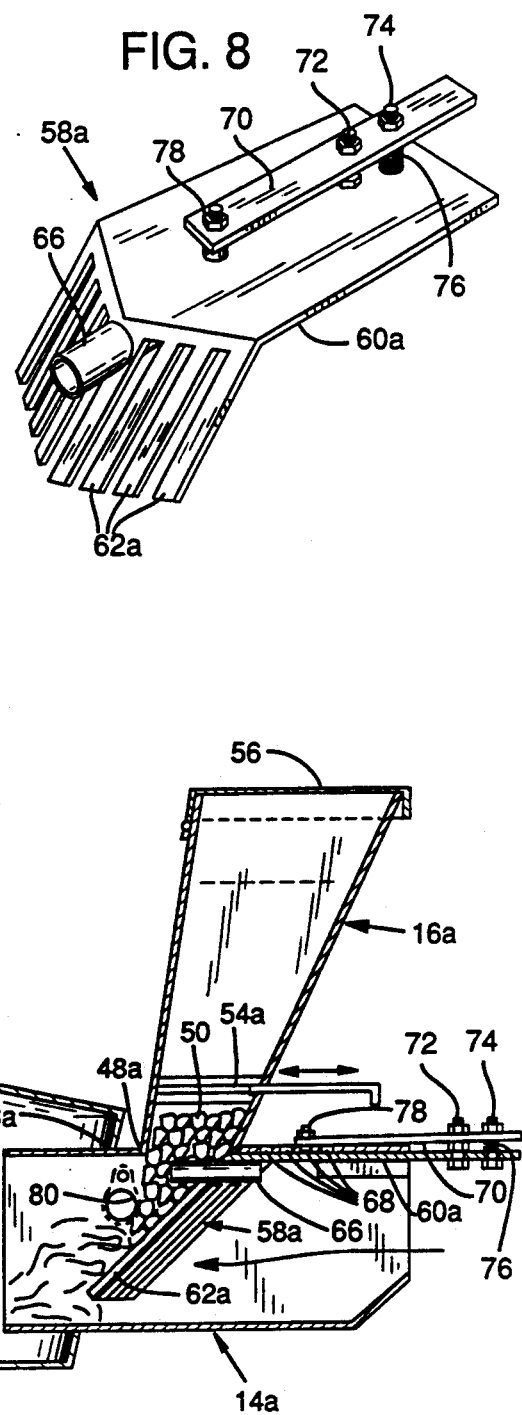

BIOMASS PELLET-BURNING ORCHARD HEATERS

This invention relates to orchard heaters. It pertains particularly to orchard heaters of the class using as fuel pelletized wood or other biomass particles.

BACKGROUND AND GENERAL STATEMENT OF THE INVENTION

In the management of agricultural acreage, particularly fruit orchards, it is conventional practice to combat killing frosts by stationing and operating at spaced intervals throughout the orchard a plurality of orchard heaters. These almost invariably are fed with fuel oil and, for obvious reasons, are known as "smudge pots". The emissions from such heaters create an air pollution problem of wide extent and significant magnitude.

Until recently, it has been thought that the smudge and smoke resulting from the operation of the orchard heaters was a key factor in overcoming the killing frost. However, in recent times this consideration has been discounted. The primary factor in preventing the frost killing of plants is the warming of the ambient air by burning of the fuel.

Concomitantly, with the increasing scarcity and rising prices of fuel oil products, there has arisen the need for the provision of an orchard heater capable of achieving this desired result while at the same time operating efficiently on pelletized wood and other biomass particles, such as whole grain corn, nutshells, comminuted straw and grasses and the like.

It is the general purpose of the present invention to provide such an orchard heater.

It is a further purpose of the invention to provide an orchard heater capable of operation using pelletized wood and other biomass particles which burns hot and clean without the production of smoke and smudge, but with the production of the large volumes of heat requisite to achieve the desired purpose.

It is another object of the present invention to provide an orchard heater of simple, inexpensive construction which is easily stored, transported, and installed; which is adjustable to suit different operating conditions and fuels; and which is reliable and foolproof in operation.

Other objects are the provision of an orchard heater adapted for use with pelletized fuels which may be started easily and rapidly; which produces a large amount of heat during long operating cycles; which during operation is not subject to plugging, either of the feed pellets or of the ash produced; which will not back-burn into the feed fuel during operation; and which will shut off positively at the conclusion of the burning cycle.

Still a further object of the invention is the provision of an orchard heater which is versatile in that it is adaptable for use as a space heater in shops, barns and sheds and which also is adaptable for use as a cooking device, i.e. as an oven or grill.

The foregoing and other objects of my invention are achieved by the provision of an orchard heater which comprises a combustion chamber which sits on the ground and communicates at its top with a chimney or stovepipe and at its side with a firebox.

The firebox in turn is provided with a draft air opening communicating with the exterior and a flue gas opening communicating with the combustion chamber.

A hopper adapted to contain pelletized fuel is mounted on top of the firebox and communicates therewith. It has a fuel discharge opening leading to the firebox.

A combination air-and fuel-flow control is mounted in the firebox across both the draft air opening and the fuel discharge opening. It is adjustable to control the flows of both air and pelletized fuel. Optionally, an oven or grill may be incorporated into the structure of the chimney thereby taking advantage of the emission of hot gas for cooking purposes.

THE DRAWINGS

In the Drawings:

FIG. 1 is a top perspective view of the orchard heater of my invention.

FIG. 2 is a sectional view taken along line 2—2 of FIG. 1.

FIG. 3 is a longitudinal sectional view taken along line 3—3 of FIG. 2.

FIG. 4 is a detailed view in top perspective of a combination air and pelletized fuel control which is a component of the orchard heater assembly.

FIG. 5 is a view in elevation, partly in section and partly broken away, showing the application of the heater to a cooking function by the inclusion of an oven assembly in the heater chimney.

FIG. 6 is a view in elevation, partly in section and partly broken away, showing the application of the heater to a cooking function by the inclusion of a grill assembly in the heater chimney.

FIG. 7 is a longitudinal sectional view similar to FIG. 3 but illustrating the orchard heater in a second embodiment.

FIG. 8 is a detailed view in top perspective, similar to FIG. 4, of a combination air and pelletized fuel control which is a component of the embodiment of the orchard heater assembly of FIG. 7.

DESCRIPTION OF THE INVENTION IN PREFERRED EMBODIMENTS

Referring particularly to FIGS. 1 and 2, the orchard heater of my invention basically comprises a combustion chamber indicated generally at 10, a chimney indicated generally at 12, a firebox indicated generally at 14, and a hopper or fuel magazine indicated generally at 16. All may be fabricated of lightweight, strong, sheetmetal components and have contours such that they may be nested during storage and telescoped together for quick assembly. Combustion chamber 10 preferably comprises a tubular section, round or rectangular in cross section, having an open top and an open bottom. It also has an opening 18 in its side a spaced distance upwardly from the ground.

The open bottom of combustion chamber 10 is adapted to sit directly on the ground for the deposit of ashes 20. It preferably is provided with means for securing it to the ground temporarily and thus stabilizing it in use. In the illustrated form of the invention the securing means comprises an external flange 22 which seats flush against the ground. The flange is provided with spaced openings for the insertion of mooring spikes 23.

Side opening 18 in the combustion chamber is adapted to mount firebox 14 in a manner to be described hereinafter.

Combustion chamber 10 mounts a tapered chimney 12 having a lower section of increased diameter which telescopes stovepipe fashion over the open upper end of combustion chamber 10.

Chimney 12 may be provided with heat deflectors 24 comprising hollow rings which engage frictionally the tapered sides of chimney 10. These serve the function of dissipating laterally the heat rising by convection from the side walls of the heater and thus widening its sphere of influence.

As illustrated in FIGS. 5 and 6, the heater may be adapted for serving cooking functions, i.e. that of providing an oven 26 as shown in FIG. 5 and that of providing a grill 28 as shown in FIG. 6. In these adaptations combustion chamber 10 preferably is fitted with a base plate 29.

Oven 26 comprises an outer shell or hot air chamber 30 having legs 31, a bottom opening surrounded by a mounting flange or collar 32, and a top opening surrounded by a mounting flange or collar 34 which supports a stovepipe 36.

The front end of oven 26 is open and receives a baking chamber 38 in sliding relationship.

Grill 28 includes a base 40 with legs 41. It has a bottom opening with encircling mounting collar 42 dimensioned for a telescoping fit over the top of chimney 12. The base is fitted with a grid 44 in the usual manner.

A ported, removable top 46 completes the grill assembly.

Firebox 14 comprises a tubular member open at both ends and arranged to telescope into side opening 18 of combustion chamber 10 in the manner illustrated in FIG. 3. It is of either rectangular or circular cross section. Its inner open end communicates with combustion chamber 10; its outer open end, with the atmosphere.

The upper surface of firebox 14 has an opening 48 in which is mounted the lower section of hopper 16.

Hopper 16 is dimensioned and contoured to contain a quantity of wood or other biomass pellets 50. Its inner side wall has an inwardly directed extension 52 which serves a pellet-guiding and retaining function.

The bottom of hopper 16 is open to provide a fuel discharge opening communicating with firebox 14. A predetermined distance upstream from the fuel discharge opening (at least 4" in the typical installation) there is provided a gate valve 54 having for its function the control of the flow of pellets from the upper portion of the hopper to the discharge opening in the lower portion thereof. It also may be used as a pellet flow shut off. As thus arranged, it prevents "back-burning" of the pellets.

The upper portion of hopper 16 also is open to provide a fill opening. This opening is covered with a lid 56 to protect the combustible contents of the hopper from the elements.

Combination air-and-fuel control means is provided to control the flow of pellets through the hopper discharge opening into the combustion chamber, as well as the flow of air into the chamber.

In the illustrative embodiment the control means comprises an angularly bent grate plate 58 having a perforated base section 60 and a slotted fuel support or grate section 62.

Grate plate 58 is mounted adjustably to the top of firebox 14 by a bolt and slot connection including bolts 64.

The embodiment of FIGS. 7 and 8 is similar to that of FIGS. 1-6 with the exception that combustion chamber 10 is presented in alternate form and flow control means 58 is shown in a modified and preferred construction.

Thus in the alternative form of the invention combustion chamber 10a is configured similarly to the historic oil burning smudge pot or "salamander" which has been used for many years for the protection of orchards under frost conditions. In the operation of an orchard heater it is desirable to create as much heat as possible as close to the ground as possible, and to keep it there as long as possible. This is what happens when the old oil salamander is used, due to the fact that there is room in the oil pot for the fire to linger and heat up a large surface area. In the operation of the heater, the pot itself is much hotter than the upper part of the heater. This indicates a more efficient utilization of the heat developed by the heater.

Accordingly there is incorporated in the presently described assembly a large diameter combustion chamber 10a having an open top and an opening 18a in its side.

The combustion chamber mounts a tapered chimney 12a fitted with heat deflectors 24a.

A firebox 14a telescopes into opening 18a in the side of the combustion chamber.

The upper surface of firebox 14a has an opening 48a in which is mounted the lower section of a fuel hopper 16a.

The bottom of hopper 16a is open to provide a fuel discharge opening communicating with firebox 14a. A gate valve 54a positioned a predetermined distance upstream from the fuel discharge opening of the hopper controls the flow of pellets from the hopper to the firebox, as described in the previously described embodiment of FIGS. 1-6.

The novel combination air-and-fuel control means (grate plate) which characterizes the heater of FIGS. 7-8 is indicated at 58a and illustrated in detail in FIG. 8. It comprises a mounting plate 60a and a grate 62a. The latter comprises a plurality of downwardly extending, convexly V-shaped teeth sloping forwardly in "snow plow" configuration.

To remove any accumulated fly ash and prevent plugging of the firebox, a draft pipe 66 is arranged parallel to the longitudinal axis of mounting plate 60a. It communicates the interior of the firebox with the source of outside air and is mounted centrally of the grate, toward the top thereof.

Means are provided for advancing and retracting the grate plate in the firebox, thereby regulating the flows of both pellets and draft air.

To this end the upper surface of firebox 14a is provided with a plurality of holes 68 arranged linearly in the direction of the longitudinal axis of the combustion chamber.

An operating lever 70 is attached to the upper surface of mounting plate 60a by means of bolts 72, 74.

Bolt 74 serves an aligning function and mounts a compression spring 76.

The inner end of lever 70 mounts a downwardly extending detent 78. This member of the assembly is dimensioned and arranged to be advanced into a selected one of openings 68 in the top of the firebox. It is biased by spring 76 in the direction of detent advancement.

OPERATION

The operation of the biomass pellet-burning orchard heater of FIGS. 1-6 is as follows:

Since its use normally is occasional, the heater is stored in disassembled condition with combustion chamber 10, chimney 12, firebox 14 and hopper 16 all stored separately, telescoped together. When the heater is to be used, the components are quickly assembled in the manner illustrated particularly in FIG. 3 with the various parts interconnected by friction fits. The heater then is mounted upright on the ground. Heat diffusing rings 24 (also friction fit) are applied to the chimney at spaced intervals. Spikes 23 are driven into the ground to secure the assembly.

Grate plate 58 is adjusted by its bolt-and-slot connection to provide a fuel discharge opening in the lower section of hopper 16 of a width predetermined to admit pellets 50 at the desired flow rate. The flow rate additionally may be controlled by operation of gate valve 54 in the lower section of the hopper.

The setting of grate plate 58 also controls the flow of air through the firebox by enlarging or diminishing the fraction thereof occupied by the burning fuel.

The fire generated by the burning wood pellets burns hot and clean and, except under conditions of extreme cold, generates enough heat to accomplish the desired purpose of preventing freezing of the vegetation which it is desired to protect. This is accomplished without the generation of air polluting soot, smoke and smudge, using instead of a fuel oil product a biomass product which may be a renewable waste product. The pellets burn almost completely and generate only a small amount of lightweight ash the major portion of which is discharged upwardly through the chimney as fly ash and does not create a nuisance. The heavier particles 20 of ash fall to the ground at the open bottom of the combustion chamber.

If it is desired to convert the orchard heater to a space heater for a shed or other working place, or to provide an oven, the oven attachment 26 may be mounted on the top of the chimney 12 in the manner illustrated in FIG. 5.

If it is desired to convert the orchard heater to a cooking grill, the grill attachment 28 may be mounted on the top of the chimney in the manner illustrated in FIG. 6.

The operation of the embodiment of FIGS. 7 and 8 is similar, with the exception that flow control element (grate plate) 58a operates with particular efficiency in the control of the flow of pellets and draft air to the firebox.

By manipulation of lever 70, the control may be adjusted between its retracted fast-burn position of FIG. 7 in which detent 78 is inserted in the outermost of openings 68 and its advanced slow burn position wherein the detent is inserted in one of the inwardly positioned openings.

Irrespective of the position of the detent, draft air pipe 66 delivers to the firebox a jet of air which serves the functions of dislodging any accumulated fly ash and blowing it up the stack.

This renders the assembly self-cleaning so that it will operate with a high degree of efficiency over a long period of time.

To start the heater, a propane torch may be directed against the fuel through opening 80 in the side wall of the combustion chamber.

When it is desired to shut off the heater, gate valve 54 is advanced to interrupt the flow of pellets from the hopper. There accordingly is no back burning of heated pellets since all of the hot pellets are fed to the combustion chamber and burned.

Having thus described in detail preferred embodiments of the present invention, it will be apparent to those skilled in the art that many physical changes may be made in the apparatus without altering the inventive concepts and principles embodied therein. The present embodiments are therefore to be considered in all respects as illustrative and not restrictive, the scope of the invention being indicated by the appended claims.

I claim:

1. A biomass pellet-burning orchard heater comprising:
    a) a combustion chamber having a top opening and a side opening,
    b) a chimney mounted on the top opening of the combustion chamber,
    c) a firebox mounted on the combustion chamber side opening and extending at the inner end thereof into the combustion chamber, the firebox having a draft air opening in the outer end thereof communicating with the atmosphere, a flue gas opening communicating with the firebox at said inner end, and a fuel access opening in the top thereof,
    d) hopper means mounted in the fuel access opening of the firebox for containing pelletized biomass fuel and having an upstream section and a downstream section, the downstream section having a fuel discharge opening communicating with the firebox,
    e) and combination air- and fuel-flow control means mounted in the firebox across both the draft air opening and the fuel discharge opening,
    f) the flow control means comprising a grate plate and mounting means mounting the plate across both the draft air opening in the firebox and the fuel discharge opening in the hopper means for controlling the delivery of pelletized fuel to the firebox.

2. The orchard heater of claim 1 including adjustable mounting means for mounting the grate plate in the firebox for adjustment across the fuel discharge opening for controlling the size of the fuel discharge opening in the hopper means.

3. The orchard heater of claim 1 including a port in a portion of the firebox outside the combustion chamber positioned for the blow torch ignition of cold, pelletized biomass fuel introduced into the firebox at the beginning of the burning operation.

4. The orchard heater of claim 1 including oven means and mounting means for mounting the oven means removably on the upper end of the chimney for reception of hot flue gas emitted thereby.

5. The orchard heater of claim 1 including grill means and mounting means for mounting the grill means removably on the upper end of the chimney for the reception of hot flue gas emitted thereby.

6. The orchard heater of claim 1 wherein the removably mounting of the chimney on the top of the combustion chamber, the firebox in the side opening of the combustion chamber, and the hopper means in the top opening of the firebox, comprises telescoping, frictional interconnections.

7. A biomass pellet-burning orchard heater comprising:
    a) a combustion chamber having a top opening and a side opening,
    b) a chimney mounted on the top opening of the combustion chamber,
    c) a firebox mounted on the combustion chamber side opening and extending at the inner end thereof into the combustion chamber, the firebox having a draft air opening in the outer end thereof communicating with the atmosphere, a flue gas opening communicating with the firebox at said inner end, and a fuel access opening in the top thereof,
d) hopper means mounted in the fuel access opening of the firebox for containing pelletized biomass fuel and having an upstream section and a downstream section, the downstream section having a fuel discharge opening communicating with the firebox,
e) and combination air- and fuel-flow control means mounted in the firebox across both the draft air opening and the fuel discharge opening,
f) the flow control means comprising a grate plate having a base section and a grate section, and mounting means adjustably mounting the base section to the firebox across the draft air opening thereof and below the fuel discharge opening in the hopper means for controlling the size of the fuel discharge opening in the hopper means.

8. The orchard heater of claim 7 including draft air pipe means mounted on the grate plate for directing a jet of atmospheric draft air into the firebox.

9. The orchard heater of claim 7 wherein the grate section comprises a plurality of downwardly extending fingers arranged in a V-shaped, snow plow configuration.

10. The orchard heater of claim 7 wherein the firebox is provided with a plurality of space openings, and detent means is mounted on the base section of the grate plate for engaging a selected one of said spaced openings, thereby positioning the grate plate in a desired location beneath the hopper means.

11. A biomass pellet-burning orchard heater comprising:
a) a combustion chamber having a top opening and a side opening,
b) a chimney mounted on the top opening of the combustion chamber,
c) a firebox mounted on the combustion chamber side opening and extending at the inner end thereof into the combustion chamber, the firebox having a draft air opening in the outer end thereof communicating with the atmosphere, a flue gas opening communicating with the firebox at said inner end, and a fuel access opening in the top thereof,
d) hopper means mounted in the fuel access opening of the firebox for containing pelletized biomass fuel and having an upstream section and a downstream section, the downstream section having a fuel discharge opening communicating with the firebox,
e) and combination air-and fuel flow control means mounted in the firebox across both the draft air opening and the fuel discharge opening,
f) the chimney being tapered downwardly to a larger cross section and a plurality of longitudinally spaced deflector means, each comprising a friction grip, radially extending ring of heat reflective material being mounted removably on the chimney.

12. A biomass pallet-burning orchard heater comprising:
a) a combustion chamber having a top opening and a side opening,
b) a chimney mounted on the top opening of the combustion chamber,
c) a firebox mounted on the combustion chamber side opening and communicating at the inner end thereof with the combustion chamber, the firebox having a draft air opening in the outer end thereof communicating with the atmosphere, a flue gas opening communicating with the firebox at said inner end, and a fuel access opening in the top thereof,
d) hopper means mounted in the fuel access opening of the firebox for containing pelletized biomass fuel and having an upstream section and a downstream section, the downstream section having a fuel discharge opening communicating with the firebox,
e) combination air- and fuel-flow control means mounted in the firebox across both the draft air opening and the fuel discharge opening, the flow control means comprising a grate plate having a base section and a grate section, and mounting means mounting the base section to the firebox across the draft air opening thereof and below the fuel discharge opening in the hopper means, and
f) draft air pipe means mounted on the grate plate for directing a jet of atmospheric draft air into the firebox.

13. A biomass pallet-burning orchard heater comprising:
a) a combustion chamber having a top opening and a side opening,
b) a chimney mounted on the top opening of the combustion chamber,
c) a firebox mounted on the combustion chamber side opening and communicating at the inner end thereof with the combustion chamber, the firebox having a draft air opening in the outer end thereof communicating with the atmosphere, a flue gas opening communicating with the firebox at said inner end, and a fuel access opening in the top thereof,
d) hopper means mounted in the fuel access opening of the firebox for containing pelletized biomass fuel and having an upstream section and a downstream section, the downstream section having a fuel discharge opening communicating with the firebox,
e) and combination air- and fuel-flow control means mounted in the firebox across both the draft air opening and the fuel discharge opening, the flow control means comprising a grate plate having a base section and a grate section, and mounting means mounting the base section to the firebox across the draft air opening thereof and below the fuel discharge opening in the hopper means, the grate section comprising a plurality of downwardly extending fingers arranged in a V-shaped, snow plow configuration.

14. A biomass pallet-burning orchard heater comprising:
a) a combustion chamber having a top opening and a side opening,
b) a chimney mounted on the top opening of the combustion chamber,
c) a firebox mounted on the combustion chamber side opening and communicating at the inner end thereof with the combustion chamber, the firebox having a draft air opening in the outer end thereof communicating with the atmosphere, a flue gas opening communicating with the firebox at said inner end, and a fuel access opening in the top thereof,
d) hopper means mounted in the fuel access opening of the firebox for containing pelletized biomass fuel and having an upstream section and a downstream section, the downstream section having a fuel discharge opening communicating with the firebox, e) and combination air- and fuel-flow control means mounted in the firebox across both the draft air opening and the fuel discharge opening, the flow control means comprising a grate plate having a base section and a grate section, and mounting means mounting the base section to the firebox across the draft air opening thereof and below the fuel discharge opening in the hopper means, the firebox being provided with a plurality of spaced openings, and detent means is mounted on the base section of the grate plate for engaging a selected one of the openings, thereby positioning the grate plate in a desired location beneath the hopper means.

* * * * *